US006942805B2

(12) United States Patent
Soest et al.

(10) Patent No.: US 6,942,805 B2
(45) Date of Patent: Sep. 13, 2005

(54) SUGAR JUICE DECOLORIZATION BY MEANS OF MONDISPERSE ANION EXCHANGERS

(75) Inventors: Hans-Karl Soest, Köln (DE); Reinhold Klipper, Köln (DE); Ulrich Schnegg, Leverkusen (DE); Martin Gladysch, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 261 days.

(21) Appl. No.: 10/007,774

(22) Filed: Nov. 9, 2001

(65) Prior Publication Data

US 2002/0088755 A1 Jul. 11, 2002

(30) Foreign Application Priority Data

Nov. 13, 2000 (DE) ........................................ 100 56 193

(51) Int. Cl.[7] ................................................ B01D 15/00

(52) U.S. Cl. ........................................ 210/660; 210/670

(58) Field of Search ................................ 210/638, 661, 210/660, 671, 275; 521/29, 30, 32

(56) References Cited

U.S. PATENT DOCUMENTS

| | | | | |
|---|---|---|---|---|
| 2,874,132 A | | 2/1959 | Riener | 260/2.1 |
| 3,791,866 A | * | 2/1974 | Kunin et al. | 127/46.2 |
| 4,082,701 A | * | 4/1978 | Fries et al. | 521/32 |
| 4,193,817 A | | 3/1980 | Dillman et al. | 127/46 A |
| 4,380,590 A | * | 4/1983 | Chong | 521/33 |
| 4,419,245 A | | 12/1983 | Barrett et al. | 210/681 |
| 4,427,794 A | | 1/1984 | Lange et al. | 521/28 |
| 4,444,961 A | | 4/1984 | Timm | 526/88 |
| 4,564,644 A | | 1/1986 | Harris | 521/28 |
| 4,666,673 A | | 5/1987 | Timm | 422/135 |
| 5,068,255 A | | 11/1991 | Harris | 521/28 |
| 5,145,606 A | | 9/1992 | Omure et al. | 252/350 |
| 5,147,937 A | | 9/1992 | Frazza et al. | 525/243 |
| 5,585,408 A | | 12/1996 | Harris et al. | 521/33 |
| 5,616,622 A | | 4/1997 | Harris et al. | 521/33 |

FOREIGN PATENT DOCUMENTS

| | | |
|---|---|---|
| DE | 199 54 393 | 3/2001 |
| EP | 0 062 088 | 10/1982 |
| EP | 100660 | 5/2000 |
| EP | 1078688 | 2/2002 |
| WO | 9954366 | 10/1999 |

OTHER PUBLICATIONS

Int. Sugar Jnl., (month unavailable) 1998, vol. 100, No. 1191, pp. 111, 112, 113, 116 & 117 "Ion exchange resins for decolorization" by Luis San Miguel Bento.

Ullmann's Encyclopedia of Industrial Chemistry, 5$^{th}$ Edition, vol. A21 (month unavailable) 1992, pp. 363–373.

Adv. Polymer Sci., vol. 5, pp. 113–213 (month unavailable) 1967, Makroporöse Styrol–Divinylbenzol–Copolymere und ihre Verwendung in der Chromatographie und zur Darstellung von Ionenaustauschem by J. Seidl, J. Malinsky, K. Dusek and W. Heitz.

* cited by examiner

*Primary Examiner*—Robert A. Hopkins
(74) *Attorney, Agent, or Firm*—Diderico van Eyl; Jennifer R. Seng; Jill Denesvich

(57) ABSTRACT

The present invention relates to a process for decolorizing sugar juices by means of monodisperse ion exchangers, preferably anion exchangers, and the use of the same for sugar juice decolorization.

5 Claims, No Drawings

SUGAR JUICE DECOLORIZATION BY MEANS OF MONDISPERSE ANION EXCHANGERS

BACKGROUND

The present application relates to a process for decolorizing sugar juices using monodisperse ion exchangers and to the use of monodisperse ion exchangers for sugar juice decolorization. Preferably, monodisperse anion exchangers are employed for the inventive use.

For simplified production of high-grade sugars, improvement in yield or production of liquid sugar, substantial decolorization or desalting of the crude sugar solutions is customary. Thus, for example, relatively high color contents in the sugar syrup do not permit, without further work, the production of high-grade raffinates or water-clear liquid sugar syrups. However, provision of such sugar quality grades is now required by most consumers; e.g., as domestic sugar or in the drinks industry.

Sugar is produced from numerous plants. Of importance from the economic aspect are the production of sugar from sugar beet and cane sugar from sugar cane as well as from corn, wheat, basis rice, cassava potatoes or starch hydrolysates.

During sugar production, a crude sugar solution, which is termed thin juice or press juice, is obtained by extracting the beet cossettes with hot water or by pressing sugar cane. In addition to the sugar contents, it contains, depending on origin, varying non-sugar contents such as alkali metal ions and alkaline earth metal ions, chloride ions and sulphate ions, pyrrolidonecarboxylic acids and amino acids. During concentration of the press juices, other pigments such as caramel pigments and melanoidins are formed.

Colored constituents present in sugars are predominantly of anionic nature. There is a great number of different substances of which some are of high-molecular-weight nature. They can contain, for example, carboxyl groups, amino groups, phenol groups and other structural elements.

Sugar solutions can be decolorized, in the case of highly colored crude solutions (>1 000 ICUMSA) by precipitation methods based on carbonatation, sulphitation or phosphatation. Less-colored solutions (<1 000 ICUMSA) are decolorized either by physical processes, such as crystallization, or by adsorption processes using ion exchangers or activated carbon.

The color content of the solutions is determined by photometric measurement at 420 nm. The details are explained in the analytical methods. The unit for the color content is ICUMSA.

ICUMSA is equal to the product $1\ 000 \cdot E_{coe}$.

$E_{coe}$ is equal to the extinction coefficient.

To decolorize sugar solutions, bead-form adsorber resins based on crosslinked polystyrene/divinylbenzene or on polyacrylate are available. The adsorber resins are generally strongly basic anion exchangers of differing porosities. Depending on the application, either macroporous or gel types are preferably used. Depending on the pigment content, a single-, two- or three-stage process is employed. Combinations of the most varied ion exchangers based on acrylate and/or styrene/divinylbenzene on the one hand and macroporous and/or gel types on the other are conceivable.

Essentially two mechanisms are involved in the immobilization of colored sugar constituents on strongly basic anion exchangers: ionic interactions between anionic color components and the charges on the ion exchanger, and hydrophobic interactions between apolar parts of the color components and the styrene/divinylbenzene matrix—M. Bento, Int. Sugar JNL., 1998, vol. 100, No. 1191, page 111.

In U.S. Pat. No. 2,874,132, gel-type strongly basic anion exchangers containing quaternary ammonium groups based on styrene/divinylbenzene having divinylbenzene contents of 0.5 to 2% by weight are used for sugar juice decolorization. The anion exchangers are used in particular in mixed beds together with weakly acidic cation exchangers.

In U.S. Pat. No. 4,193,817, macroporous strongly basic anion exchangers containing quaternary ammonium groups in the chloride form based on styrene/divinylbenzene are used for sugar juice decolorization of cane sugars. The ion exchangers are packed into columns. At least two columns are connected sequentially in series.

An information publication from Rohm & Haas, amberhi-lites, No. 108, November 1968, page 239, describes the use of strongly basic gel-type and macroporous anion exchangers for decolorizing cane and beet sugar solutions.

Macroporous anion exchangers and acrylic resins have a higher absorption capacity for pigment components and show a higher physical stability than gel-type anion exchangers in sugar juice decolorizations.

The efficiency of the bead-type adsorber resins is determined, inter alia, by the porosity, the internal surface area, the particle size and the degree of functionalization. Fine particles have a greater external surface area and as a result a better adsorption capacity. However, narrow limits are set owing to the high viscosity of the highly concentrated sugar syrups and the maximum permissible pressure drop which is very rapidly established on filtering the sugar solution through the adsorber resin bed. In contrast, coarse beads cause only a low pressure drop, but are distinguished by a lower adsorption capacity for the sugar colors.

The ion exchangers and adsorbers used according to the prior art are bead polymers having a broad bead size distribution (heterodisperse ion exchangers). The bead diameters of these adsorber resins are in the range from approximately 0.3 to 1.2 mm. The bead polymers underlying them can be prepared by known methods of suspension polymerization, see Ullmann's Encyclopedia of Industrial Chemistry, 5th ed., Vol. A 21, 363–373, VCH Verlagsgesellschaft mbh, Weinheim 1992.

Owing to the presence of ion exchangers of different size, the beads exhibit different adsorption capacities for the pigments. This leads to a broad adsorption front and separation front.

An object of the present invention is therefore the search for suitable ion exchangers which avoid the disadvantages of the broad adsorption front and separation front and using which sugar juices of high quality and grade are obtained. The high quality and grade are exhibited in the lowest possible discoloration of the sugar juices.

SUMMARY

The invention relates to a process comprising treating a colored sugar juice with a monodisperse anion exchanger and decolorizing the sugar juice. The invention also relates to a decolorized juice obtained by such a process. The invention also relates to a composition comprising a colored sugar juice and a monodisperse anion exchanger. These and other features, aspects, and advantages of the present invention will become better understood with reference to the following description and appended claims.

DESCRIPTION

The invention relates to a process comprising treating a colored sugar juice with a monodisperse anion exchanger and decolorizing the sugar juice. The invention also relates to a juice obtained by such a process. The invention also relates to a composition comprising a colored sugar juice and a monodisperse anion exchanger.

Very recently, ion exchangers having as uniform a particle size as possible (monodisperse ion exchangers) have increasingly become of importance in other applications.

Monodisperse ion exchangers, compared with heterodisperse ion exchangers, have, inter alia, the following advantages: a lower pressure drop, a higher utilizable capacity, improved kinetics and sharp separation fronts, and greater mechanical and osmotic stability. Monodisperse ion exchangers can be obtained by functionalizing monodisperse bead polymers.

In the present application, substances are described as monodisperse when at least 90% by volume or by mass of the particles have a diameter which is in a range around the most frequent diameter having a width of ±10% of the most frequent diameter. For example, in the case of a bead polymer whose spheres have a most frequent diameter of 0.50 mm, at least 90% by volume or by mass are in a size range between 0.45 mm and 0.55 mm, or in the case of a bead polymer whose spheres have a most frequent diameter of 0.70 mm, at least 90% by volume or by mass are in a size range between 0.77 mm and 0.63 mm.

The ion exchangers can be present or used as microporous or gel-type or macroporous bead polymers.

The terms microporous or gel-type or macroporous are known from the specialist literature, for example from Adv. Polymer Sci., Vol. 5, pages 113–213 (1967).

One of the possibilities of preparing monodisperse ion exchangers is what is termed the seed/feed process, according to which a monodisperse nonfunctionalized polymer ("seed") is swollen in monomer and this is then polymerized. Seed/feed processes are described, in for example, the following patents: EP-0 098 130 B1, EP-0 101 943 B1, EP-A 418, 603, EP-A 448 391, EP-A 0 062 088, U.S. Pat. No. 4,419,245.

Another possibility for preparing monodisperse ion exchangers is to prepare the underlying monodisperse bead polymers by a process in which the uniformly developed monomer droplets are formed by vibratory excitation of a laminar stream of monomers and are then polymerized, see U.S. Pat. No. 4,444,961, EP-0 046 535, DE-A-19954393.

In the preparation of the macroporous monodisperse bead polymers, a uniformly formed droplet of a monomer/pore-forming material mixture is formed by vibratory excitation of a laminar stream of a mixture of monomers and pore-forming material and is then polymerized.

The anion exchangers to be employed for the inventive use occur as bead polymers in monodisperse form. They contain secondary or tertiary amino groups or quaternary ammonium groups or their mixtures. Thus the use of anion exchangers containing trimethylamine, dimethylammonium, trimethylammonium and hydroxyethylammonium groups is customary.

They consist of crosslinked polymers, ethylenically monounsaturated monomers, which for the most part consist of at least one compound from the group consisting of styrene, vinyltoluene, ethylstyrene, α-methyl-styrene or their ring-halogenated derivatives such as chlorostyrene; in addition, they can also contain one or more compounds from the group consisting of vinylbenzyl chloride, acrylic acid, their salts or their esters, in particular their methyl esters, in addition vinylnaphthalenes, vinylxylenes, or the nitrites or amides of acrylic or methacrylic acids.

The polymers are crosslinked, preferably by copolymerization with crosslinking monomers containing more than one, preferably 2 or 3, copolymerizable C═C double bond (s) per molecule. Such crosslinking monomers comprise, for example, polyfunctional vinylaromatics such as di- or trivinylbenzenes, divinylethylbenzene, divinyltoluene, divinylxylene, divinylethylbenzene, divinyinaphthalene, polyfunctional allylaromatics such as di- or triallylbenzenes, polyfunctional vinyl heterocycles or allyl heterocycles such as trivinyl or triallyl cyanurate or isocyanurate, N,N'—$C_1$–$C_6$-alkylenediacrylamides or -dimethacrylamides, such as N,N'-methylenediacrylamide or -dimethacrylamide, N,N'-ethylenediacryl-amide or -dimethacrylamide, polyvinyl ethers or polyallyl ethers of saturated $C_2$–$C_{20}$ polyols containing 2 to 4 OH groups per molecule, e.g., ethylene glycol divinyl ether or ethylene glycol diallyl ether or diethylene glycol divinyl ether or diethylene glycol diallyl ether, esters of unsaturated $C_3$–$C_{12}$-alcohols or of saturated $C_2$–$C_{20}$ polyols containing 2 to 4 OH groups per molecule, such as allyl methacrylate, ethylene glycol di(meth)acrylate, glycerol tri(meth)acrylate, pentaerythritol tetra(meth)acrylate, divinylethyleneurea, divinylpropyleneurea, divinyl adipate, aliphatic or cycloaliphatic olefins containing 2 or 3 isolated C═C double bonds, such as hexa-1,5-diene, 2,5-dimethylhexa-1,5-diene, octa-1,7-diene, 1,2,4-trivinylcyclohexane. Crosslinking monomers which have proved themselves particularly are divinylbenzene (as isomeric mixture) and mixtures of divinylbenzene and aliphatic $C_6$–$C_{12}$-hydrocarbons containing 2 or 3 C═C double bonds. The crosslinking monomers are generally used in amounts of 1 to 80% by weight, preferably 2 to 25% by weight, based on the total amount of the polymerizable monomers used.

The crosslinking monomers need not be used in pure form, but can alternatively be used in the form of their industrially handled mixture of lower purity (e.g., divinylbenzene mixed with ethylstyrene).

The copolymerization of monomer and crosslinker is usually initiated by free-radical formers which are monomer-soluble. Preferred free-radical-forming catalysts comprise, for example, diacyl peroxides, such as diacetyl peroxide, dibenzoyl peroxide, di-p-chlorobenzoyl peroxide, lauroyl peroxide, peroxyesters such as tert-butyl peroxyacetate, tert-butyl peroctoate, tert-butyl peroxypivalate, tert-butyl peroxy-2-ethyl-hexanoate, tert-butyl peroxybenzoate, dicyclohexyl peroxydicarbonate, alkyl peroxides such as bis(tert-butylperoxybutane), dicumyl peroxide, tert-butyl cumyl peroxide, hydroperoxides such as cumene hydroperoxide, tert-butyl hydroperoxide, ketone peroxides such as cyclohexanone hydroperoxide, methyl ethyl ketone hydroperoxide, acetylacetone peroxide or, preferably, azoisobutyrodinitrile.

The free-radical formers can be used in catalytic amounts, that is to say preferably from about 0.01 to about 2.5% by weight, in particular from about 0.12 to about 1.5% by weight, based on the total of monomer and crosslinker.

The water-insoluble monomer/crosslinker mixture is added to an aqueous phase which, to stabilize the monomer/crosslinker droplets in the disperse phase and the resultant bead polymers, preferably comprises at least one protective colloid. Protective colloids are natural and synthetic water-soluble polymers, for example gelatin, starch, polyvinyl alcohol, polyvinylpyrrolidone, polyacrylic acid, polymethacrylic acid or copolymers of (meth) acrylic acid or (meth)acrylic esters. Compounds which are also very highly suitable are cellulose derivatives, in particular cellulose ethers or cellulose esters, such as methyl hydroxyethyl cellulose, methyl hydroxypropyl cellulose, hydroxyethyl cellulose or carboxymethyl cellulose. The amount of the protective colloids used is generally from about 0.02 to about 1% by weight, preferably from about 0.05 to about 0.3% by weight, based on the aqueous phase.

The weight ratio of aqueous phase/organic phase is in the range of preferably from about 0.5 to about 20, in particular from about 0.75 to about 5.

According to a particular embodiment of the present invention, the base polymers are prepared in the presence of a buffer system during the polymerization. Preference is given to buffer systems which set the pH of the aqueous phase at the start of the polymerization to a value from about 14 to about 6, preferably from about 12 to about 8. Under these conditions protective colloids containing carboxylic acid groups occur wholly or partly as salts. In this manner the action of the protective colloids is beneficially affected. The buffer concentration in the aqueous phase is preferably from about 0.5 to about 5000 mmol, in particular from about 2.5 to about 100 mmol, per liter of aqueous phase.

To prepare monodisperse bead polymers having as uniform a particle size as possible, the monomer stream is injected into the aqueous phase, the generation of droplets of uniform size and avoidance of coalescence being ensured by vibratory-excited jet breakdown and/or microencapsulation of the resultant monomer droplets (EP 0 046 535 B1 and EP 0 051 210 B1).

The polymerization temperature depends on the decomposition temperature of the initiator used. It is generally between about 50 and about 150° C., preferably between about 55 and about 100° C. The polymerization takes from about 0.5 to some hours. It has proved useful to use a temperature program in which the polymerization is started at low temperature, for example 60° C., and the reaction temperature is increased with increasing polymerization conversion.

The resultant bead polymers can be fed to the functionalization as such or via an intermediate step accessible by what is termed a seed/feed process, with increased particle size. A seed/feed process comprises the process steps of swelling the originally obtained polymer ("seed") with copolymerizable monomers ("feed") and polymerizing the monomer which has penetrated into the polymer. Suitable seed/feed processes are described, for example in EP 0 098 130 B1, EP 0 101 943 B1 or EP 0 802 936 B1.

In order that the monodisperse ion exchangers to be used according to the invention obtain the macroporous structure, pore-forming material is added to the monomer/crosslinker mixture, such as described, for example, in Seidl et al., Adv. Polym. Sci., Vol. 5 (1967), p. 113 to 213, for example aliphatic hydrocarbons, alcohols, esters, ethers, ketones, trialkylamines, nitro compounds, preferably hexane, octane, isooctane, isododecane, isodecane, methyl isobutyl ketone or methyl isobutyl carbinol, in amounts of 1 to 150% by weight, preferably 40 to 100% by weight, in particular 50 to 80% by weight, based on the total of monomer and crosslinker.

Macroporous bead polymers have pore diameters of approximately 50 angstroms and above.

Surprisingly, it has now been found that gel-type and macroporous monodisperse anion exchangers based on styrene/divinylbenzene can decolorize and desalt sugar solutions more thoroughly than comparable heterodisperse anion exchangers. Below applicants discuss analytical methods that can be used to decolorize sugar juices.

Analytical Methods

The monodisperse anion exchangers to be used according to the invention, termed below adsorber resins (1 resin volume=1 bed volume [BV]) are washed into a heatable glass filter tube, for example, containing G0 glass frit. The resin bed is backwashed for 15 minutes in order if necessary to establish a customary classification of the resin beads and free the resin bed from any fragments.

After heating the system to the desired experimental temperature of 20° C. to 100° C., preferably 55° C. to 85° C., the aqueous sugar solution to be decolorized, at a possible concentration of 5–72% dry matter content of sugar and a color content of 50-3000 ICUMSA, is filtered via the adsorber resin bed in the direction of loading from top to bottom or in the reverse flow direction. In the case of upward flow loading, the formation of a fixed bed is to be sought after. The filtration rate during the decolorization is 1–5 bed volumes/hour. The volume of sugar solution which can be decolorized in this arrangement depends on the color content of the initial solution. Depending on the color content, 50–200 bed volumes per cycle are possible.

After the sugar solution intended for decolorization has passed through, the adsorber resin is sweetened off with deionized water, that is to say freed from sugar. In this case the water front fed in from the top displaces the denser sugar solution from the filter until sugar can no longer be detected (dry matter content=0) in the filter effluent. The flow rate during sweetening off corresponds to the flow rate which had been established during loading. The water volume required for sweetening off, a parameter important for the sugar industry, depending on the adsorber resin is 2–4 BV.

The adsorber resin is then regenerated with 2 BV of an alkaline sodium chloride solution of concentration 10% NaCl and 1–2% NaOH, and in the process freed from sugar colors absorbed during the prior loading. The regeneration solution is filtered through the resin bed in the course of one hour and then displaced with deionized water at the same flow rate and the residual chemicals are also washed out with deionized water until the pH is 7. The water volume required for this is determined.

After completion of this cycle, the adsorber resin is ready for the next decolorization.

ICUMSA Calculation (Photometric Color Measurement at a Wavelength of 420 nm)

| | |
|---|---|
| Color in ICUMSA = | $1000 \cdot E_{coe}$ |
| $E_{coe}$ = | $100 \times \frac{\text{Ext.}}{I \times \%\ DM \times D}$ |
| $E_{coe}$ = | extinction coefficient in $cm^2/g$ |
| Ext. = | extinction at a wavelength of 420 nm |
| I = | cuvette path length in cm |
| % DM = | dry matter content in % |
| D = | density in $g/cm^3$ |

The invention is further described in the following illustrative examples in which all parts and percentages are by weight unless otherwise indicated.

EXAMPLE

Following the procedures described in the Analytical Methods above, the following results were obtained:

TABLE 1

| Decolorization of sugar solutions using monodisperse and heterodisperse anion exchangers | | | | |
|---|---|---|---|---|
| Bed volumes | Resin A monodisperse gel-type strongly basic anion exchanger | Resin B heterodisperse gel-type strongly basic anion exchanger | Resin C Monodisperse Macroporous Strongly basic Anion exchanger | Resin D heterodisperse macroporous strongly basic anion exchanger |
| 5 | 91.8 | 79.0 | 88.8 | 86.5 |
| 10 | 91.6 | 72.0 | 88.7 | 86.3 |
| 55 | 82.4 | 53.0 | 77.1 | 74.0 |
| 65 | 80.3 | 50.1 | 74.7 | 71.4 |
| 72 | 79.0 | 47.2 | 72.4 | 69.0 |

Column 1 of Table 1 shows the amount of liquid in bed volumes of beet sugar solution to be decolorized which was filtered using resins A to D.

The beet sugar solution to be decolorized had a color content of 1,000 ICUMSA, a temperature of 75° C. and a dry matter content of 65%. Loading was performed at a space velocity of 3 bed volumes per hour and the total loading time is 24 hours.

Columns 2 to 5 of Table 1 gave the percentage decolorization from the feed of beet sugar solution to be decolorized for the said resins.

The monodisperse gel-type and macroporous strongly basic anion exchangers showed significantly better decolorization performances than the comparable heterodisperse types.

Table 2 gives the amounts of water which are required as rinse water, sweet-on water and sweet-off water for the monodisperse gel-type and macroporous strongly basic anion exchangers and the heterodisperse strongly basic macroporous anion exchangers.

Sweet-on water volume: the anion exchanger which was prepared for decolorization was charged with a sugar solution of predetermined concentration, for example 60 Brix, until the sugar concentration in the feed was the same as that in the effluent. The amount of water required for this was equal to the sweet-on water volume.

Sweet-off water volume: after passage of the sugar solution provided for decolorization, the adsorber resin was sweetened off with deionized water, that is to say freed from sugar. In the course of this the water front fed from the top displaced the denser sugar solution out of the filter until sugar could no longer be detected in the filter effluent (dry matter content equal to zero). The water volume required for sweetening off was the sweet-off water volume.

Rinse water: after completion of loading the resin with sugar solution, the resin was regenerated with 2 bed volumes of an alkaline sodium chloride solution. The residues of the regeneration chemicals were washed out with deionized water. The water volume required for this was the rinse water.

TABLE 2

| Rinse water, sweet-on and sweet-off water volumes in sugar juice decolorization | | | |
|---|---|---|---|
| | Lewatit Mono Plus ® M 500 | Lewatit Mono Plus ® MP 500 | Lewatit ® MP 500 |
| Rinse water in bed volumes | 2.25 | 2.75 | 4.0 |
| Sweet on in bed volumes | 1.25 | 1.25 | 1.5 |
| Sweet off in bed volumes | 1.25 | 1.75 | 2.0 |

The two monodisperse resins required significantly less water than a heterodisperse strongly basic, macroporous anion exchanger.

Monodisperse gel-type strongly basic anion exchanger required still less water for the said processes than the monodisperse, macroporous strongly basic anion exchanger.

Although the present invention has been described in detail with reference to certain preferred versions thereof, other variations are possible. Therefore, the spirit and scope of the appended claims should not be limited to the description of the versions contained therein.

What is claimed is:

1. A process comprising treating a colored sugar juice with a monodisperse anion exchanger having bead polymer spheres with a diameter ranging from 0.46 to 55 mm and decolorizing the sugar juice.

2. The process according to claim 1, wherein the monodisperse anion exchanger is selected from the group consisting of micro-porous bead polymers, gel-type bead polymers and macroporous bead polymers.

3. The process according to claim 1, wherein the monodisperse anion exchangers are functionalized with primary or tertiary amino groups or quaternary amino groups or their mixtures.

4. The process according to Claim 1, wherein the monodisperse anion exchangers are crosslinked polymers of ethylenically monounsaturated monomers.

5. The process according to claim 1, wherein the treating of the colored juice comprises (i) flushing monodisperse anion exchangers into a heatable glass filter tube, (ii) heating the system from about 20° C. to about 100° C., (iii) filtering the aqueous sugar solution to be decolorized via the adsorber resin bed in the loading direction from top to bottom or in reverse flow direction, (iv) draining off adsorber resin with deionized water and finally, (v) regenerating the adsorber resin.

* * * * *